United States Patent [19]

Tufts et al.

[11] Patent Number: 4,880,846

[45] Date of Patent: Nov. 14, 1989

[54] THERMOSET MOLDING COMPOSITIONS CATALYZED BY 1,4-BENZOQUINONE SALTS OF 1,8-DIAZA-BICYCLO(5.4.0)UNDEC-7-ENE

[75] Inventors: Timothy A. Tufts, Powell, Ohio; Robert S. Bock, Hazelwood, Mo.; Christopher T. Moss, Dublin, Ohio

[73] Assignee: Ashland Oil, Inc., Ashland, Ky.

[21] Appl. No.: 277,884

[22] Filed: Nov. 30, 1988

[51] Int. Cl.$^4$ .............................................. C08G 18/20
[52] U.S. Cl. ...................................... 521/129; 528/54
[58] Field of Search ........................... 521/129; 528/54

[56] References Cited

U.S. PATENT DOCUMENTS 4,798,879  1/1989  Hannah et al. ...................... 528/54

*Primary Examiner*—Maurice J. Welsh
*Attorney, Agent, or Firm*—Mueller and Smith

[57] ABSTRACT

Disclosed is a process for the catalyzed reaction of an isocyanate and an active hydrogen compound wherein the reaction is conducted in the presence of a novel catalyst comprising the salt of 1,8-diazobicyclo(5.4.0)undec-7-ene and 1,4-benzoquinone. Preferred catalyzed reaction mixtures comprise Reaction Injection Molding urethanes (RIM). The novel catalyst salts provide a controlled induction period prior to the onset of gelation of the reaction mixture while providing complete cure of the reaction mixture thereafter.

10 Claims, No Drawings

THERMOSET MOLDING COMPOSITIONS CATALYZED BY 1,4-BENZOQUINONE SALTS OF 1,8-DIAZA-BICYCLO(5.4.0)UNDEC-7-ENE

BACKGROUND OF THE INVENTION

The present invention relates to the catalyzed reaction of an isocyanate compound and an active hydrogen compound and more particularly to a new catalyst salt useful in such catalyzed reaction.

Reaction Injection Moldings (RIM) of urethanes basically consist of a polyol and a polyisocyanate, usually with an extender (e.g. a glycol or a diamine), optionally with a blowing agent (e.g. air), optionally reinforcing material (e.g. glass, mica, etc.), wetting agents, and the like, which materials are high pressure injected through a mixing head into a pre-heated mold with usual post-molding baking thereafter applied. RIM urethanes can range from low modulus to very high modulus material parts, foamed on the interior but with a smooth surface. RIM urethanes are capable of being made into very large one-piece parts which are very light in weight. Typical present-day uses of RIM parts include, for example, automobile parts (e.g. bumpers, air deflectors, fenders, front ends, etc.), business machine housings, ski boots, office furniture, and a wide variety of products.

When used particularly in a process known as Structural RIM (SRIM) or wet mat molding, the RIM technique is subject to additional constraints. For example, upon mixing of the polyol, polyisocyanate, and other ingredients forming the SRIM reaction mixture, it is desirable that this reaction mixture exhibit virtually no viscosity increase for a period of time followed by rapid, full cure of the reaction mixture. This controlled induction period permits long flow time through glass fiber or other reinforcement as well as provides improved fiber wet-out. A controlled induction period of 60–70 seconds is useful in a variety of commercial RIM operations. In order to achieve the controlled induction period, the catalyst activity must concomitantly be delayed. After the delay, however, very rapid catalytic activity should be exhibited for achieving rapid cure of the RIM reaction mixture.

U.S. Pat. No. 3,769,244 discloses the preparation of diaza-bicycloalkene catalysts useful in the reaction of a polyol and a polyisocyanate. Acid addition salts of the diaza-bicyclo-alkene catalysts also disclosed therein have been determined to exhibit a delay in the initiation time of the polyol/polyisocyanate reaction. Such delay in initiation also is disclosed in U.S. Pat. No. 4,582,861 utilizing certain disclosed quaternary ammonium salts. Unfortunately, these prior art catalysts exhibit delay times proportional with the $pK_a$ of the acids used in their preparation as well as prolonged cure times. Additionally, extensive post-molding baking schedules still are required.

BROAD STATEMENT OF THE INVENTION

The present invention is directed to the catalyzed reaction of an isocyanate and an active hydrogen compound. The improvement in process of the present invention comprises conducting the reaction in the presence of a catalyst comprising the salt of 1,8-diaza-bicyclo(5.4.0)undec-7-ene and 1,4-benzoquinone. Reaction mixtures for making RIM urethanes comprise the preferred reaction mixture in which the novel catalyst salt is useful. Another aspect of the present invention comprises the reaction mixture catalyzed with the catalyst salt disclosed herein. A further aspect of the present invention is a catalyzed RIM urethane-forming reaction mixture containing the catalyst salt disclosed herein.

Advantages of the present invention include the ability to provide a controlled induction period or initiation time delay wherein virtually no viscosity increase of the reaction mixture is exhibited. A further advantage is the rapid cure which ensues utilizing the disclosed catalyst salt following the controlled induction period. A further advantage is the complete cure which is achieved utilizing the catalyst salt, thus often precluding the usual post-molding baking schedules heretofore used in the RIM urethane art. These and other advantages of the present invention will be readily apparent to those skilled in the art from the description which follows.

DETAILED DESCRIPTION OF THE INVENTION

As noted above, the acid portion of prior art catalyst salts may be thought of as blocking agents which temporarily render inactive the catalytic activity exhibited by the amine moiety of the catalyst salts. Since the reaction of an isocyanate group and an active hydrogen group is base catalyzed, the initiation time delay exhibited by the acid moiety is not unexpected. In fact, conventional acid blocking agents in the art not only are consistent with the expected delay, but the delay is proportional to the strength of the acid, as determined by the $pK_a$ of the acid. Accordingly, the greater the $pK_a$ of the blocking acid is, the longer the delay period or induction period to gel is. While a measure of control capability with respect to matching the $pK_a$ of the blocking acid to the desired induction time exists, post-molding baking schedules still are required. In other words, while the induction time period can be adjusted to be quite acceptable at commercial operations, the resin formulator also must accept the detrimental effect exhibited by the acid manifest in the incomplete cures experienced utilizing the acid blocking agents.

The blocking agent used in forming the novel catalyst salts of the present invention similarly provides controlled induction periods as do conventional acids. Unlike with use of conventional acid blocking agents, however, the novel catalyst salts do not contain an acid moiety. Also noteworthy, is the completeness of cure of the reaction mixture utilizing the novel catalyst salts, thus decreasing, if not eliminating, the requirement for conventional post-molding baking. Accordingly, an unusual blocking agent or aid for forming amine salt catalysts is disclosed herein.

Details on the preparation of the diaza-bicyclo-alkene can be found in U.S. Pat. No. 3,769,244, discussed above. Such cyclic amines are supplied commercially as catalysts useful in the preparation of polyurethanes. The salt moiety of the novel catalyst salts of the present invention comprises 1,4-benzoquinone and can be represented as follows:

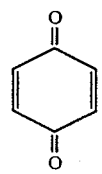

Preferably, the entire amine catalyst content is blocked or salted with the 1,4-benzoquinone agent though less than complete or stoichiometric blocking still can be useful.

Referring now to RIM urethane reaction mixture formulations, the first component of the reaction mixture comprises a short chain diol or glycol extender in combination with long-chain polyols or the like. Short chain diols most often are alkylene glycols typically ranging from about 2 to 8 carbon atoms in length. Alternatively, the short chain diols can be polyoxyalkylene glycols resulting from the reaction of an alkylene oxide (e.g. ethylene oxide, propylene oxide, or the like) with a short chain alkylene glycol. The level of short chain diol typically will be in excess of about 5 to 10 percent by weight of the long chain polyol and the resulting blend is intended for use in RIM technology.

Referring to the long chain soft segments, most often these compounds are long chain polyols, such as polyols typically being polyoxyalkylene polyols with average molecular weight ranging from between about 1,000 and 20,000, and include diols, triols, tetraols, and the like. Examples of such long chain polyols can be found in U.S. Pat. Nos. 4,385,133, 3,929,730, 3,993,576, and 4,227,032. Additionally, sucrose and amine-based polyols, and amine-terminated polyoxyalkylene oligomers have been proposed for use in RIM technology.

Often, the level of short chain diol required in RIM formulations are such that the solubility level of the short chain diol and the long chain polyol is exceeded. Thus, the use of esterol compatibilizing agents as disclosed in U.S. Pat. No. 4,6763,696 may be desired. Additionally, compatible polyol blends for high modulus polyurethane compositions comprising a storage stable blend of a short-chain diol and a long-chain polyether polyol wherein the polyether polyol comprises at least two polyoxy propylene triols is proposed in commonly-assigned application Ser. No. 07/192,858, filed May 11, 1988. One of the polyoxy propylene triols is shown to have a molecular weight of between about 2,000 and 8,000 while the second has a molecular weight of between about 300 and 900. The triols are taught as being present in an amount such that the blend does not phase separate under storage. For such storage stable blend, substantially no polyoxyethylene polyol content should be included therein.

Any of the organic polyisocyanates commonly employed in the art of preparing polyurethanes can be employed in forming urethane parts from the compatibilized blend of the present invention. Such polyisocyanates often are polymeric isocyanates in order to reduce toxic vapors of isocyanate monomers. Further, alcohol-modified and other modified isocyanate compositions (e.g. thiocyanates) may be used. Polyisocyanates preferably will have from about 2-4 isocyanate groups per molecule in forming urethane parts. Suitable polyisocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl)thiophosphate, cyclohexane, diisocyanate (CHDI), bis(isocyanatomethyl)cyclohexane ($H_6$XDI), dicyclohexylmethane diisocyanate ($H_{12}$MDI), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-naphthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

The proportion of isocyanate groups to hydroxyl groups in the urethane-forming composition (isocyanate index) typically will range from about 0.5:1 to about 4:1, preferably 0.8:1 to 1.2:1, though such ratio can vary as is well known in the art. The catalyst salt typically is contained in the polyol portion of the urethane-forming reaction mixture. These ingredients then are combined in conventional fashion depending upon the type of thermoset molding operation being conducted. Industrial uses for the novel catalyst salt include RIM urethanes, structural foams, cast elastomers, Resin Transfer Molding (RTM) and the like. Specific products prepared by such processes include adhesives, polyurethane reinforced foams, elastomers, structural rigid plastics, and the like.

Other commonly-used additives for RIM products, for example, can be applied to the present invention provided that they are inert to the stability and reactivity of the composition. Such additives include, for example, fillers, blowing agents, reinforcing agents, dyes, pigments, moisture scavengers, diluents, surfactants, mold release agents, and the like.

The following Examples show how the present invention has been practiced, but should not be construed as limiting. In this application, all units are in the metric system and all percentages and proportions are by weight, unless otherwise expressly indicated. Also, all citations set forth herein are expressly incorporated herein by reference.

EXAMPLE

An inventive catalyst salt was prepared by adding 1,4-benzoquinone (15.58 g) to propylene glycol (70 g) and placing the mixture into an 80° C. oven until the benzoquinone dissolved. (Not all of the benzoquinone will dissolve completely until after the addition of DBU later). After one hour of heating, 1,8-diazo-bicyclo(5.4.0)undec-7-ene (DBU, 19.42 g) in 0.5 g increments was added to the warm solution with swirling of the solution after each addition. This step should be practiced cautiously as the addition can be explosive.

Pluracol P-410 (a 400 mw polypropylene glycol, BASF Wyandotte Corp.) and 1 phr of the catalyst salt (phr being one weight part of catalyst salt per 100 weight parts of polyol) were mixed together followed by the addition of a polyisocyanate and their mechanical mixing for 30 seconds. After 40 seconds from the commencement of mixing, the reaction mixture was poured onto a mold held at a temperature of about 102° C. (215° F.). The time to gel then was measured from the time that pouring commenced. The gelled sample was left on the heated mold for 5 minutes after determination of the gel point. Thereafter, the thermoset molded sample was removed, cooled to room temperature, and flexed to determine toughness. The reaction conditions, polyisocyanates used, and results recorded are set forth below:

TABLE 1

| Wt % DBU in Propylene Glycol | Mole Ratio DBU:BQ | Catalyst Salt (phr solution) | RD-2* Co-Catalyst (wt %) | Polyisocyanate** Type | Index | Gel Time (sec) | Comments |
|---|---|---|---|---|---|---|---|
| Controls | | | | | | | |
| None | None | 0.5 | — | MM-103 | 120 | 24–27 | Tough |
|  |  |  |  | E-249 | 150 | 15–23 | Tough |
|  |  |  |  | MR | 120 | 18–22 | Tough |
| None | None | 0.5 | 5 | MR | 120 | 38 | Tough |
| Inventive | | | | | | | |
| 10 | 1:1 | 10 | — | MM-103 | 120 | 18 | Semi-Brittle |
| 10 | 1:1 | 10 | — | E-429 | 150 | 18 | Tough,Flexible |
| 10 | 1:1 | 10 | — | MR | 120 | 17 | Tough,Flexible |
| 33 | 1:3 | 3.5 | — | MM-103 | 120 | 36 | Tough,Flexible |
| 33 | 1:3 | 3 | — | E-429 | 150 | 100-115 | Brittle |
| 33 | 1:3 | 3 | — | MR | 120 | 100-115 | Brittle |
| 33 | 1:2 | 3 | — | MM-103 | 120 | 80 | Tough,Flexible |
| 33 | 1:2 | 3 | 5 | MR | 120 | 56 | Tough |

*RD-2 is the diglycidyl ether of 1,4-butanediol
**MM-103 is Lupranate MM103 brand carbodiimide-modified 2.1-functional MDI,BASF Wyandotte Corp.
E-429 is Mondur E-429 brand polymeric diphenylmethane diisocyanate (60–70% MDI, specific gravity 1.24 at 25° C., bulk density 10.3 lb/gal, Mobay Chemical Corp.)
MR is Mondur MR brand polymeric diphenylmethane diisocyanate (31.5% NCO content, Mobay Chemical Corp.)

The above-tabulated results clearly demonstrate the ability of the novel catalyst salts to provide a controlled induction while providing a tough, flexible thermoset molded product. Gel time differences are evident based upon the type of polyisocyanate used, as would be expected. The RD-2 co-catalyst does have some effect on gel times based upon the above-tabulated data.

We claim:

1. In a process for the catalyzed reaction of a reaction mixture comprising an isocyanate and an active hydrogen compound, the improvement which comprises conducting said reaction in the presence of a catalyst comprising the salt of 1,8-diazo-bicyclo(5.4.0)undec-7-ene and 1,4-benzoquinone.

2. The process of claim 1 wherein said active hydrogen compound comprises a polyol.

3. The process of claim 2 wherein said active hydrogen compound comprises a mixture of a $C_2$-$C_8$ alkylene glycol and a polyoxyalkylene polyol.

4. The process of claim 3 wherein said polyoxyalkylene polyol has a molecular weight of between about 1,000 and 20,000.

5. The process of claim 1 wherein said isocyanate comprises a polyisocyanate.

6. The process of claim 5 wherein said polyisocyanate is selected from the group consisting of hexamethylene diisocyanate, 4,4'-toluene diisocyanate, diphenylmethane diisocyanate, polymethyl polyphenyl isocyanate, m- and p-phenylene diisocyanates, bitolylene diisocyanate, triphenylmethane triisocyanate, tris-(4-isocyanatophenyl)thiophosphate, cyclohexane diisocyanate, bis-(isocyanatomethyl)cyclohexane, dicyclohexylmethane diisocyanate, trimethylhexane diisocyanate, dimer acid diisocyanate, dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-napthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and mixtures thereof.

7. The process of claim 1 wherein the ratio of isocyanate grops from said isocyanate to the active hydrogen groups of said active hydrogen compound ranges from between about 0.5:1 and about 4:1.

8. The process of claim 1 wherein said isocyanate comprises a polyisocyanate and said active hydrogen compound comprises a polyol, wherein the ratio of isocyanate groups to hydroxyl groups ranges from between about 0.5:1 and about 4:1.

9. The process of claim 1 wherein said reaction mixture comprises two packages, one package comprising said isocyanate and the second package comprising a blend of said active hydrogen compound and said catalyst.

10. The process of claim 1 wherein said reaction mixture additionally comprises an organic solvent.

* * * * *